United States Patent
Elshorbagy et al.

(10) Patent No.: US 8,590,416 B2
(45) Date of Patent: Nov. 26, 2013

(54) LOWER EXTREMITY VEHICLE NAVIGATION CONTROL SYSTEM

(75) Inventors: Hazem Elshorbagy, Al Ain (AE); Husam Haboush, Al Ain (AE); Reem Almarzouqi, Al Ain (AE); Yousef Haik, Al Ain (AE)

(73) Assignee: United Arab Emirates University, Al Ain (AE)

( * ) Notice: Subject to any disclaimer, the term of this patent is extended or adjusted under 35 U.S.C. 154(b) by 0 days.

(21) Appl. No.: 13/399,486

(22) Filed: Feb. 17, 2012

(65) Prior Publication Data

US 2012/0210820 A1    Aug. 23, 2012

Related U.S. Application Data

(60) Provisional application No. 61/444,722, filed on Feb. 19, 2011.

(51) Int. Cl.
*G05G 1/30* (2008.04)

(52) U.S. Cl.
USPC .......................................................... 74/512

(58) Field of Classification Search
USPC ........... 74/494, 512, 513, 552, 560, 561, 563; 280/87.1, 774
See application file for complete search history.

(56) References Cited

U.S. PATENT DOCUMENTS

| | | | |
|---|---|---|---|
| 231,017 A * | 8/1880 | Davis | 114/363 |
| 2,667,939 A * | 2/1954 | Purkey | 180/78 |
| 2,865,223 A | 12/1958 | Kope | |
| 3,687,248 A | 8/1972 | Holub | |
| 3,776,064 A | 12/1973 | Rose | |
| 4,883,028 A | 11/1989 | Wu | |
| 5,598,742 A * | 2/1997 | Kim | 74/494 |
| 6,126,497 A * | 10/2000 | Stockton | 440/7 |
| 7,121,572 B1 | 10/2006 | Jaffe et al. | |
| 7,243,630 B2 * | 7/2007 | Boe et al. | 123/179.4 |
| 2005/0275205 A1 | 12/2005 | Ahnafield | |
| 2010/0235041 A1 | 9/2010 | Aeberhard et al. | |

OTHER PUBLICATIONS

Patent Cooperation Treaty, "International Search Report", U.S. Patent and Trademark Office, in PCT Application No. PCT/US2012/025659, Document of 1 page, May 29, 2012.

* cited by examiner

*Primary Examiner* — Vicky Johnson
(74) *Attorney, Agent, or Firm* — Akerman Senterfitt; Michael K. Dixon

(57) ABSTRACT

A lower extremity vehicle navigation control system for driving a vehicle with one or more lower extremities is disclosed. The system may include a steering engagement surface, a brake engagement surface, and an acceleration control engagement surface positioned between a driver's seat and a vehicle floor forming a driver's compartment such that a driver may use his lower extremity to steer the vehicle, to brake and to accelerate. Each of the engagement surfaces may be in relative proximity to each other such that a driver may easily move his lower extremity between contact with each of the engagement surfaces. The system may also include gear shifting arm and a foot activated ignition system, both of which may be operable by one or more lower extremities of a driver of a vehicle.

19 Claims, 2 Drawing Sheets

LOWER EXTREMITY VEHICLE NAVIGATION CONTROL SYSTEM

CROSS-REFERENCE TO RELATED APPLICATION

This application claims priority to U.S. Provisional Patent Application No. 61/444,722, filed Feb. 19, 2011, the entirety of which is incorporated herein.

FIELD OF THE INVENTION

This invention is directed generally to vehicle control systems, and more particularly to driver side, vehicle control systems.

BACKGROUND

Driving a vehicle currently requires functionalization of both arms and one or more feet. The mobility of people with physical disabilities, such as with upper extremity disabilities, is hindered by the lack of proper devices that utilize other methods of controlling the maneuverability a vehicles. Thus, a need exists for vehicle control systems that are more accommodating to drivers with upper extremity disabilities.

SUMMARY OF THE INVENTION

A lower extremity vehicle navigation control system for driving a vehicle with one or more lower extremities is disclosed. The system may include a steering engagement surface, a brake engagement surface, and an acceleration control engagement surface positioned between a driver's seat and a vehicle floor forming a driver's compartment such that a driver may use his lower extremity to steer the vehicle, to brake and to accelerate. Each of the engagement surfaces may be in relative proximity to each other such that a driver may easily move his lower extremity between contact with each of the engagement surfaces. The system may also include gear shifting arm and a foot activated ignition system, both of which may be operable by one or more lower extremities of a driver of a vehicle.

The lower extremity vehicle navigation control system may include one or more steering engagement surfaces couplable to a steering shaft in communication with steering system controlling a direction of wheel travel. The steering engagement surface may be positioned between a driver's seat and a vehicle floor forming a driver's compartment. The steering engagement surface may include a foot receptacle attached to a support positioned radially outward from a hub. The support may be a circular support formed from a plurality of spokes extending radially outward from the hub. The foot receptacle may extend radially outward of the circular support. The foot receptacle may be rotatably coupled to the circular support. The foot receptacle may include a foot retaining system formed from one or more straps forming a foot retaining loop at a midfoot region. The foot retaining system may also include a heel guard. The foot receptacle may include a circumferential retainer.

The lower extremity vehicle navigation control system may include one or more brake engagement surfaces couplable to a braking shaft in communication with a braking system controlling braking of wheels of the vehicle. The brake engagement surface may be positioned between the driver's seat and the vehicle floor forming the driver's compartment and may be positioned within eight inches of a plane in which the steering engagement surface resides. At least a portion of the brake engagement surface may reside in a brake engagement plane that is aligned with the plane in which the steering engagement surface resides.

The lower extremity vehicle navigation control system may include one or more acceleration control engagement surfaces couplable to a throttle system controlling acceleration of the vehicle. The acceleration control engagement surface may be positioned between the driver's seat and the vehicle floor forming the driver's compartment and may be positioned within eight inches of the plane in which the steering engagement surface resides. At least a portion of the acceleration control engagement surface may reside in an acceleration control engagement plane that is aligned with the plane in which the steering engagement surface resides.

The lower extremity vehicle navigation control system may include one or more gear shifting arms that are operable by at least one lower extremity of a driver of the vehicle. The gear shifting arm may have an engagement surface that is positioned within eight inches of a plane in which the steering engagement surface resides. The engagement surface of the gear shifting arm may have an elongated arm positioned generally orthogonal to a supporting gear shift support arm.

The lower extremity vehicle navigation control system may include one or more foot activated ignition systems. The foot activated ignition system may include an ignition engagement surface that is positioned within eight inches of a plane in which the steering engagement surface resides. The brake engagement surface may be positioned right of the steering engagement surface, and the acceleration control engagement surface may be positioned right of the at least one brake engagement surface.

An advantage of the lower extremity vehicle navigation control system is that the system enables a driver without any upper extremities to drive the vehicle having the system installed therein, thereby providing the driver with enhanced mobility.

Other advantages of the lower extremity vehicle navigation control system are that the system is energy and space efficient, compact, easy to use, flexible for multi-purpose use, easy to manufacture, simple and easy to maintain, and environmentally friendly.

Yet another advantage of the lower extremity vehicle navigation control system is that the system enables the vehicle to be used to assist people with disabilities and may be used in entertainment parks, military and peacekeeping operations and in industrial settings that requires a single operator with multiple demands on upper extremity functions.

These and other embodiments are described in more detail below.

BRIEF DESCRIPTION OF THE DRAWINGS

The accompanying drawings, which are incorporated in and form a part of the specification, illustrate embodiments of the presently disclosed invention and, together with the description, disclose the principles of the invention.

DETAILED DESCRIPTION OF THE INVENTION

Figure 1:
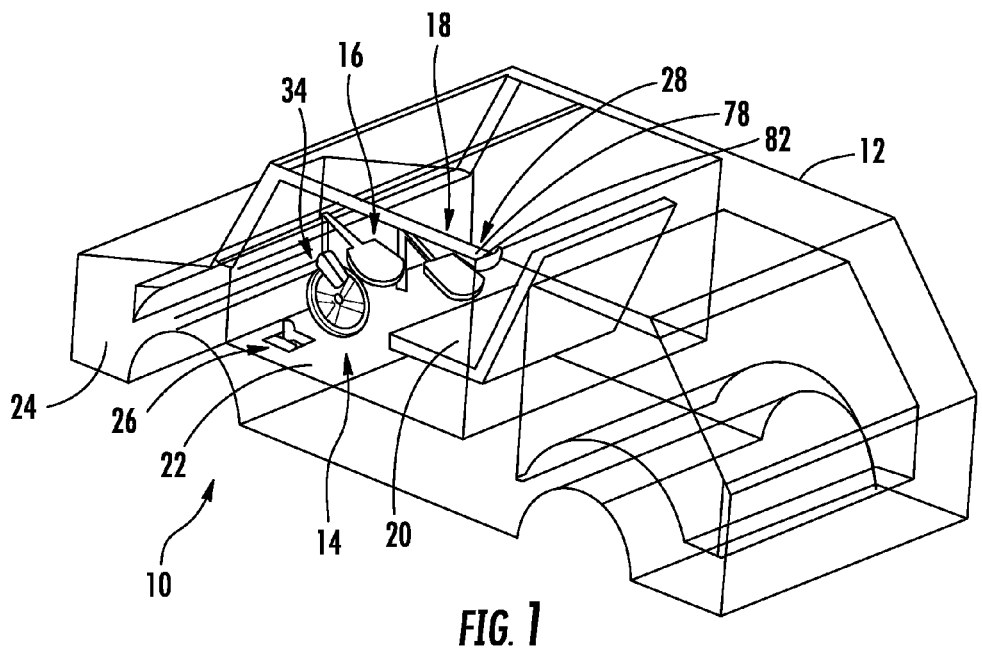
FIG. 1 is a perspective view of a schematic diagram of the lower extremity vehicle navigation control system installed within a vehicle.
Figure 2:
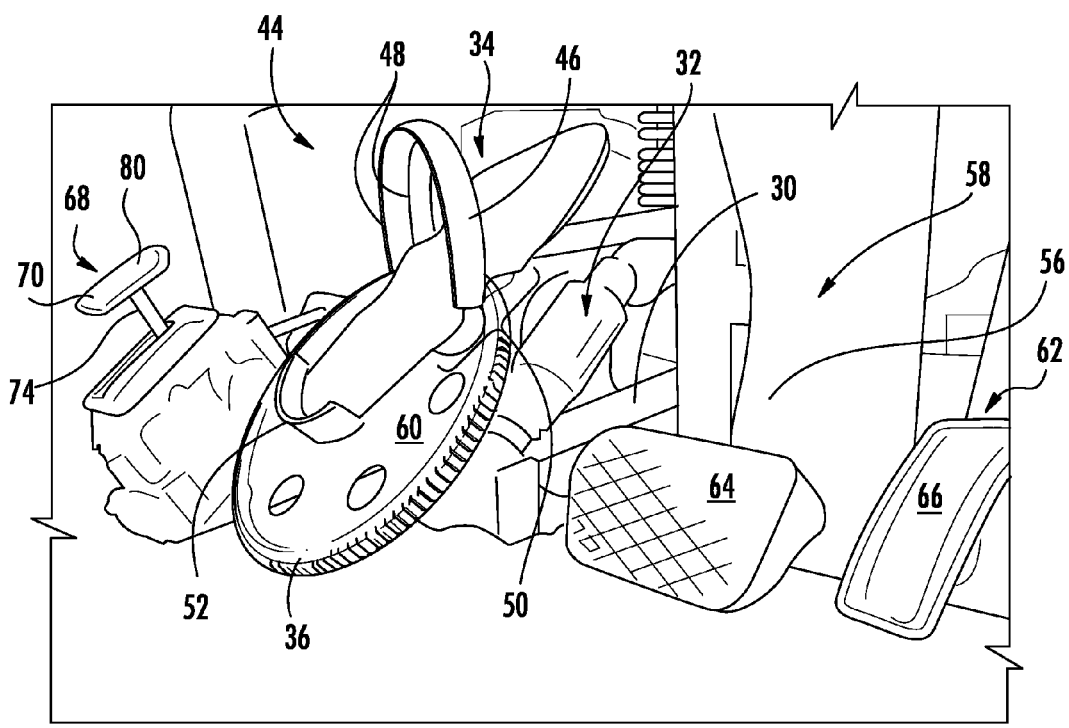
FIG. 2 is another perspective view of a schematic diagram of the lower extremity vehicle navigation control system installed within a vehicle.
Figure 3:
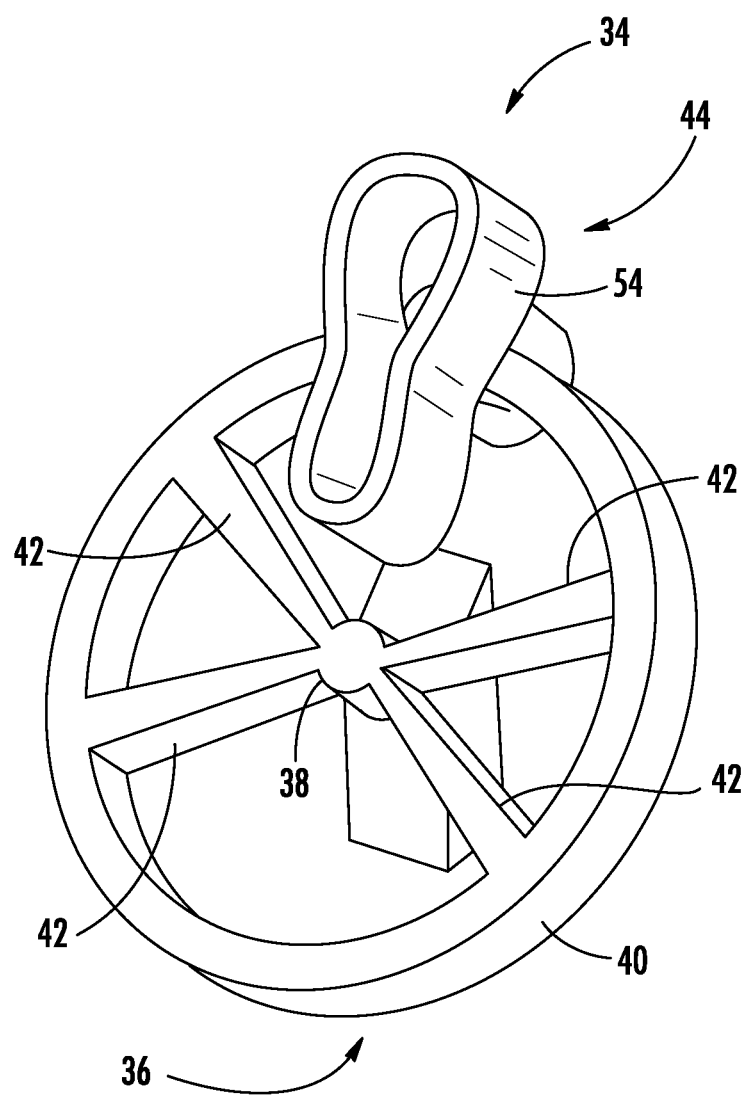
FIG. 3 is a perspective view of a fuel source.

As shown in FIGS. 1-3, a lower extremity vehicle navigation control system 10 for driving a vehicle 12 with one or more lower extremities is disclosed. The system 10 may include a steering engagement surface 14, a brake engagement surface 16, and an acceleration control engagement surface 18 positioned between a driver's seat 20 and a vehicle floor 22 forming a driver's compartment 24 such that a driver may use his lower extremity to steer the vehicle 12, to brake and to accelerate. Each of the engagement surfaces 14, 16, and 18 may be in relative proximity to each other such that a driver may easily move his lower extremity between contact with each of the engagement surfaces 14, 16, and 18. The system 10 may also include gear shifting arm 26 and a foot activated ignition system 28, both of which may be operable by one or more lower extremities of a driver of a vehicle 12.

The lower extremity vehicle navigation control system 10 for a vehicle 12 may include one or more steering engagement surfaces 14 couplable to a steering shaft 30 in communication with steering system 32 controlling a direction of wheel travel. The steering engagement surface 14 may be positioned between the driver's seat 20 and the vehicle floor 22 forming a driver's compartment 24. In at least one embodiment, the steering engagement surface 14 may be positioned a distance from the seat 20 that is comfortable for a lower extremity of a driver, such as, but not limited to, a foot or prosthesis, to contact. The steering engagement surface 14 may be positioned less than 12 inches from the vehicle floor 22.

The steering engagement surface 14 may include a foot receptacle 34 attached to a support 36 positioned radially outward from a hub 38. The support 36 may be a circular support 40 formed from a plurality of spokes 42 extending radially outward from the hub. The circular support 40 may be continuous or discontinuous. The foot receptacle 34 may extend radially outward of the circular support 40. The foot receptacle 34 may be formed from one or more elements and may be formed from a solid surface, mesh surface or other appropriate configurations. The foot receptacle 34 may be rotatably coupled to the circular support 40 via a rotatable connection such as, but not limited to, a connection supported by one or more bearings. The foot receptacle 34 may include a foot retaining system 44 formed from one or more straps 46 forming a foot retaining loop 48 at a midfoot region 50. The strap 46 may be formed from any appropriate, durable material. The foot retaining system 44 may also include a heel guard 52. The foot retaining system 44 may include a circumferential retainer 54. The foot receptacle 34, heel guard 52, and circumferential retainer 54 may be formed from a metal, plastic, carbon matrix, or other appropriate material.

The lower extremity vehicle navigation control system 10 may include one or more brake engagement surfaces 16 couplable to a braking shaft 56 in communication with a braking system 58 controlling braking of wheels of the vehicle 12. The brake engagement surface 16 may be positioned between the driver's seat 20 and the vehicle floor 22 forming the driver's compartment 24 and is positioned within eight inches of a plane 60 in which the steering engagement surface 14 resides. In at least one embodiment, the brake engagement surface 16 may be positioned within about three inches of the plane 60 in which the steering engagement surface 14 resides. At least a portion of the at least one brake engagement surface 16 may reside in a brake engagement plane 64 that is aligned with the plane 60 in which the steering engagement surface 14 resides. In at least one embodiment, the brake engagement plane 64 may reside in the plane 60 of the steering engagement surface 60. The brake engagement surface 16 may be a flat or curved surface. The brake engagement surface 16 may include nonslip material to facilitate contact by a driver's lower extremity. The brake engagement surface 16 may be sized to be generally less than a width of a driver's foot and shorter than a driver's foot.

The lower extremity vehicle navigation control system 10 may include one or more acceleration control engagement surfaces 18 couplable to a throttle system 62 controlling acceleration of the vehicle 12. The acceleration control engagement surface 18 may be positioned between the driver's seat 20 and the vehicle floor 22 forming the driver's compartment 24 and may be positioned within eight inches of the plane 60 in which the steering engagement surface resides. In at least one embodiment, the acceleration control engagement surface 18 may be positioned within about three inches of the plane 60 in which the steering engagement surface 14 resides. At least a portion of the acceleration control engagement surface 18 may reside in an acceleration control engagement plane 66 that is aligned with the plane 60 in which the steering engagement surface 14 resides. In at least one embodiment, the acceleration control engagement plane 66 may reside in the plane 66 of the steering engagement surface 60. The acceleration control engagement surface 18 may be a flat or curved surface. The acceleration control engagement surface 18 may include nonslip material to facilitate contact by a driver's lower extremity. The acceleration control engagement surface 18 may be sized to be generally less than a width of a driver's foot and shorter than a driver's foot.

The lower extremity vehicle navigation control system 10 may include one or more gear shifting arms 68 that is operable by at least one lower extremity of a driver of the vehicle 12. The gear shifting arm 68 may have an engagement surface 70 that is positioned within eight inches of a plane 60 in which the steering engagement surface 14 resides. The engagement surface 70 of the gear shifting arm 68 may be an elongated arm 72 that is generally orthogonal to a supporting gear shift support arm 74. In at least one embodiment, the engagement surface 70 may be positioned within about three inches of the plane 60 in which the steering engagement surface 14 resides. At least a portion of the engagement surface 70 may reside in an elongated arm plane 80 that is aligned with the plane 60 in which the steering engagement surface 14 resides. In at least one embodiment, the elongated arm plane 80 may reside in the plane 60 of the steering engagement surface 60.

The lower extremity vehicle navigation control system 10 may include a foot activated ignition system 28 to start the engine of the vehicle 12. The foot activated ignition system 28 may be activated by ignition engagement surface 78 being depressed. The foot activated ignition system 28 may include an ignition engagement surface 78 that is positioned within eight inches of the plane 60 in which the steering engagement surface 14 resides. In at least one embodiment, the ignition engagement surface 78 may be positioned within about three inches of the plane 60 in which the steering engagement surface 14 resides. At least a portion of the ignition engagement surface 78 may reside in an ignition plane 82 that is aligned with the plane 60 in which the steering engagement surface 14 resides. In at least one embodiment, the ignition plane 82 may reside in the plane 60 of the steering engagement surface 60.

The lower extremity vehicle navigation control system 10 may have any appropriate configuration such that the components previously described may be positioned in any appropriate configuration. In at least one embodiment, the brake engagement surface 16 may be positioned right of the steering engagement surface 14, and the acceleration control engagement surface 18 may be positioned right of the brake engagement surface 16. The ignition engagement surface 78 of the foot activated ignition system 28 may be positioned to the right of the acceleration control engagement surface 18. The engagement surface 70 of the gear shifting arm 68 may be positioned to the left of the steering engagement surface 14. The lower extremity vehicle navigation control system 10 is not limited to this configuration but may be positioned in other appropriate positions.

During use, drivers without one or more upper extremities or without use of their upper extremities, may use the system 10 to drive the vehicle. In addition, drivers with full use of their upper extremities may use their lower extremities to drive the vehicle 12 and may use their upper extremities to undertake other functions, such as, but not limited to, shooting, mapping, monitoring the surroundings with and without optics and instruments within the vehicle 12. For military and peacekeeping operations, a machine gun or other appropriate artillery may be positioned in the vehicle 12 or their controls may be positioned within the vehicle 12 such that the driver may easily reach and operate the guns, artillery or controls, or any combination thereof, while driving the vehicle 12. The system 10 allows assembly and disassembly of the artillery easily as per the requirement. The machine gun or artillery, depending on the amount of control required, may be either controlled by a single upper extremity or both upper extremities. In the case of light artillery, a single upper extremity would be sufficient to control it, thus leaving room for the other upper extremity to perform other functions such as, but not limited to, reloading ammunition into the weapons, communicating via radio, satellite phone and the like, and other such activities.

The foregoing is provided for purposes of illustrating, explaining, and describing embodiments of this invention. Modifications and adaptations to these embodiments will be apparent to those skilled in the art and may be made without departing from the scope or spirit of this invention.

We claim:

1. A lower extremity vehicle navigation control system for a vehicle, comprising:
    at least one steering engagement surface couplable to a steering shaft in communication with steering system controlling a direction of wheel travel;
    wherein the at least one steering engagement surface is positioned between a driver's seat and a vehicle floor forming a driver's compartment;
    at least one brake engagement surface couplable to a braking shaft in communication with a braking system controlling braking of wheels of the vehicle;
    wherein the at least one brake engagement surface is positioned between the driver's seat and the vehicle floor forming the driver's compartment and is positioned within eight inches of a plane in which the steering engagement surface resides;
    at least one acceleration control engagement surface couplable to a throttle system controlling acceleration of the vehicle;
    wherein the at least one acceleration control engagement surface is positioned between the driver's seat and the vehicle floor forming the driver's compartment and is positioned within eight inches of the plane in which the steering engagement surface resides;
    a gear shifting arm that is operable by at least one lower extremity of a driver of the vehicle, wherein the gear shifting arm includes an elongated arm orthogonal to a supporting gear shift support arm such that the elongated arm is within eight inches of a plane in which the at least one steering engagement surface resides.

2. The lower extremity vehicle navigation control system of claim 1, wherein the at least one steering engagement surface comprises a foot receptacle attached to a support positioned radially outward from a hub.

3. The lower extremity vehicle navigation control system of claim 2, wherein the support is a circular support formed from a plurality of spokes extending radially outward from the hub.

4. The lower extremity vehicle navigation control system of claim 3, wherein the foot receptacle extends radially outward of the circular support.

5. The lower extremity vehicle navigation control system of claim 2, wherein the foot receptacle is rotatably coupled to the circular support.

6. The lower extremity vehicle navigation control system of claim 2, wherein the foot receptacle includes a foot retaining system comprising at least one strap forming a foot retaining loop at a midfoot region.

7. The lower extremity vehicle navigation control system of claim 6, wherein the foot retaining system further comprises a heel guard.

8. The lower extremity vehicle navigation control system of claim 2, wherein the foot receptacle includes circumferential retainer.

9. The lower extremity vehicle navigation control system of claim 1, wherein at least a portion of the at least one brake engagement surface resides in a brake engagement plane that is aligned with the plane in which the at least one steering engagement surface resides.

10. The lower extremity vehicle navigation control system of claim 1, wherein at least a portion of the at least one acceleration control engagement surface resides in an acceleration control engagement plane that is aligned with the plane in which the at least one steering engagement surface resides.

11. The lower extremity vehicle navigation control system of claim 1, wherein the gear shifting arm has an engagement surface that is positioned within eight inches of a plane in which the steering engagement surface resides.

12. The lower extremity vehicle navigation control system of claim 1, wherein the engagement surface of the gear shifting arm is an elongated arm generally orthogonal to a supporting gear shift support arm.

13. The lower extremity vehicle navigation control system of claim 1, further comprising a foot activated ignition system.

14. The lower extremity vehicle navigation control system of claim 13, wherein the foot activated ignition system comprises an ignition engagement surface that is positioned within eight inches of a plane in which the steering engagement surface resides.

15. The lower extremity vehicle navigation control system of claim 1, wherein the at least one brake engagement surface is positioned right of the at least one steering engagement surface, and the at least one acceleration control engagement surface is positioned right of the at least one brake engagement surface.

16. A lower extremity vehicle navigation control system for a vehicle, comprising:
    at least one steering engagement surface couplable to a steering shaft in communication with steering system controlling a direction of wheel travel;
    wherein the at least one steering engagement surface is positioned between a driver's seat and a vehicle floor forming a driver's compartment;

wherein the at least one steering engagement surface comprises a rotatable foot receptacle attached to a support positioned radially outward from a hub;

at least one brake engagement surface couplable to a braking shaft in communication with a braking system controlling braking of wheels of the vehicle;

wherein the at least one brake engagement surface is positioned between the driver's seat and the vehicle floor forming the driver's compartment and is positioned within eight inches of a plane in which the steering engagement surface resides;

at least one acceleration control engagement surface couplable to a throttle system controlling acceleration of the vehicle;

wherein the at least one acceleration control engagement surface is positioned between the driver's seat and the vehicle floor forming the driver's compartment and is positioned within eight inches of the plane in which the steering engagement surface resides;

a gear shifting arm that is operable by at least one lower extremity of a driver of the vehicle;

wherein the gear shifting arm has an engagement surface that is positioned within three inches of a plane in which the steering engagement surface resides; and a foot activated ignition system having an ignition engagement surface that is positioned within eight inches of a plane in which the steering engagement surface resides.

17. The lower extremity vehicle navigation control system of claim 16, wherein the support is a circular support formed from a plurality of spokes extending radially outward from the hub and wherein the foot receptacle extends radially outward of the circular support and wherein the foot receptacle includes a foot retaining system comprising at least one strap forming a foot retaining loop at a midfoot region and a heel guard.

18. The lower extremity vehicle navigation control system of claim 16, wherein the support is a circular support formed from a plurality of spokes extending radially outward from the hub and wherein the foot receptacle extends radially outward of the circular support and wherein the foot receptacle includes circumferential retainer.

19. The lower extremity vehicle navigation control system of claim 16, wherein at least a portion of the at least one brake engagement surface resides in a brake engagement plane that is aligned with the plane in which the at least one steering engagement surface resides, wherein at least a portion of the at least one acceleration control engagement surface resides in an acceleration control engagement plane that is aligned with the plane in which the at least one steering engagement surface resides, and wherein the at least one brake engagement surface is positioned right of the at least one steering engagement surface, and the at least one acceleration control engagement surface is positioned right of the at least one brake engagement surface.

* * * * *